(12) United States Patent
Bates et al.

(10) Patent No.: US 11,754,578 B2
(45) Date of Patent: Sep. 12, 2023

(54) MODULAR TRANSPORT PLANE AND LABORATORY DISTRIBUTION SYSTEM

(71) Applicant: Roche Diagnostics Operations, Inc., Indianapolis, IN (US)

(72) Inventors: Christopher William Bates, Tamm (DE); Thomas Martin, Stuttgart (DE)

(73) Assignee: Roche Diagnostics Operations, Inc., Indianapolis, IN (US)

(*) Notice: Subject to any disclaimer, the term of this patent is extended or adjusted under 35 U.S.C. 154(b) by 104 days.

(21) Appl. No.: 17/643,435

(22) Filed: Dec. 9, 2021

(65) Prior Publication Data

US 2022/0196692 A1 Jun. 23, 2022

(30) Foreign Application Priority Data

Dec. 21, 2020 (EP) .................................... 20215886

(51) Int. Cl.
*G01N 35/04* (2006.01)
*B65G 54/02* (2006.01)

(52) U.S. Cl.
CPC ............. *G01N 35/04* (2013.01); *B65G 54/02* (2013.01); *G01N 2035/0477* (2013.01)

(58) Field of Classification Search
CPC .......... G01N 35/04; G01N 2035/0477; B65G 54/02; B65G 47/74; B65G 39/10; B65G 41/006; B65G 47/24
See application file for complete search history.

(56) References Cited

U.S. PATENT DOCUMENTS

| 10,288,634 B2 | 5/2019 | Kaeppeli |
| 10,989,725 B2 | 4/2021 | Ren |
| 2018/0340952 A1* | 11/2018 | Kaeppeli ................ G01N 35/04 |

FOREIGN PATENT DOCUMENTS

| DE | 10261659 A1 | 7/2004 |
| EP | 3006943 A1 | 4/2016 |
| EP | 3211430 A1 | 8/2017 |
| JP | 2020-201167 A | 12/2020 |
| WO | 2017/144219 A1 | 8/2017 |
| WO | 2017/144220 A1 | 8/2017 |
| WO | 2017/144221 A1 | 8/2017 |

OTHER PUBLICATIONS

European Search Report issued May 17, 2021, in Application No. 20215886.1, 2 pp.

* cited by examiner

*Primary Examiner* — Jennifer Wecker
*Assistant Examiner* — Ali Husain Faraz
(74) *Attorney, Agent, or Firm* — Roche Diagnostics Operations, Inc.

(57) ABSTRACT

The present disclosure relates to a modular transport plane with a plurality of transport module units, each transport module unit comprising an actuator assembly with a back iron, and with an infrastructure system arranged below the transport module units and supporting the transport module units on a floor, characterized in that the transport module units are floatingly connected to the infrastructure system to allow a relative horizontal movement between the transport module units and the infrastructure system, wherein neighboring transport module units are connected via the back irons for a horizontal force transmission between neighboring transport module units in response to a relative horizontal movement between neighboring transport module units.

17 Claims, 6 Drawing Sheets

MODULAR TRANSPORT PLANE AND LABORATORY DISTRIBUTION SYSTEM

CROSS-REFERENCE TO RELATED APPLICATIONS

This application claims priority to European Patent Application No. 20215886.1, filed 21 Dec. 2020, the disclosure of which is hereby incorporated by reference in its entirety.

TECHNICAL FIELD

The present disclosure relates to a modular transport plane for a laboratory distribution system. The present disclosure further relates to a laboratory distribution system and to a laboratory automation system comprising a laboratory distribution system.

BACKGROUND

A laboratory automation system comprises a plurality of pre-analytical, analytical and/or post-analytical stations, in which specimens, for example blood, saliva, swab and other specimens taken from human or animal bodies, are processed. For specimen processing and movement, it is generally known to provide various containers, such as test tubes or vials, containing the specimen. The test tubes are also referred to as specimen tubes or sample tubes. In the context of the application, containers such as test tubes or vials for containing specimen are referred to as specimen containers.

For a movement or distribution of specimen containers, laboratory distribution systems comprising a transport plane and a plurality of carriers are known. The carriers are configured to retain one or more specimen container in an upright or vertical position, and each comprise at least one magnetically active element such as, for example, at least one permanent magnet. The transport plane is configured to support the carriers on a driving surface and comprises a plurality of electro-magnetic actuators stationary arranged below the driving surface, wherein the electromagnetic actuators can be controlled to move a carrier placed on the driving surface by applying a magnetic force to the carrier.

SUMMARY

Although the embodiments of the present disclosure are not limited to specific advantages or functionality, it is noted that in accordance with the present disclosure a modular transport plane is presented in which high forces caused by thermal expansion and/or contraction are avoided. Also presented is a laboratory distribution system and a laboratory automation system with a modular transport plane.

According to one embodiment of the present disclosure, a modular transport plane with a plurality of transport module units and with an infrastructure system arranged below the transport module units and supporting the transport module units on a floor is provided, wherein each transport module unit comprises an actuator assembly with a back iron, wherein the transport module units are floatingly connected to the infrastructure system to allow a relative horizontal movement between the transport module units and the infrastructure system, and wherein neighboring transport module units are connected via the back irons for a horizontal force transmission between neighboring transport module units in response to a relative horizontal movement between neighboring transport module units.

These and other features and advantages of the embodiments of the present disclosure will be more fully understood from the following detailed description taken together with the accompany claims. It is noted that the scope of the claims is defined by the recitations therein and not by the specific discussions of features and advantages set forth in the present description.

BRIEF DESCRIPTION OF THE DRAWINGS

The following detailed description of the embodiments of the present description can be best understood when read in conjunction with the following drawings, where like structure is indicated with like reference numerals and in which.

Figure 1:
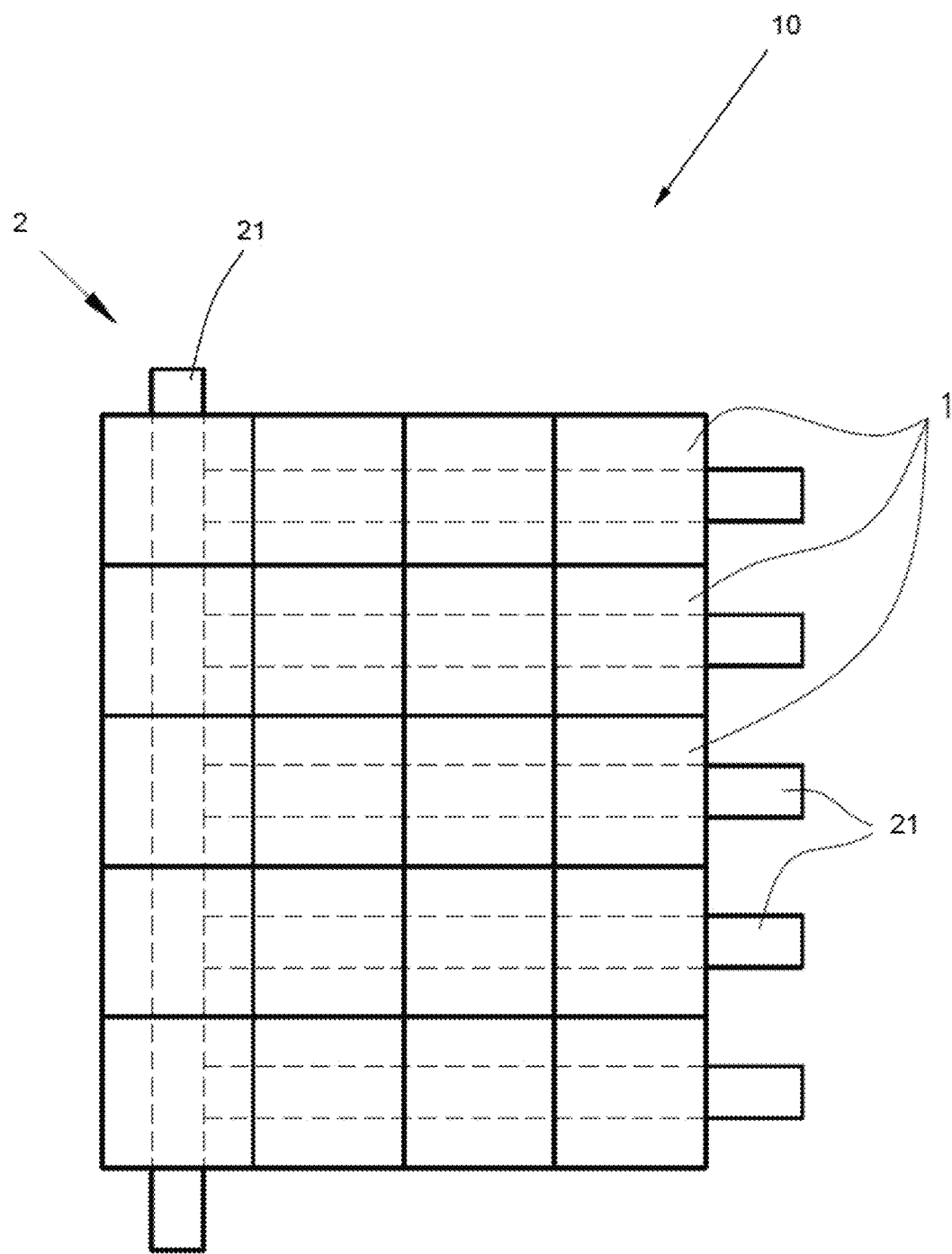
FIG. 1 is a schematic top view of a modular transport plane for a laboratory distribution system built from several transport module units in accordance with an embodiment of the present disclosure.

Skilled artisans appreciate that elements in the figures are illustrated for simplicity and clarity and have not been drawn to scale. For example, dimensions of some of the elements in the figures may be exaggerated relative to other elements to help improve understanding of the embodiments of the present disclosure.

DETAILED DESCRIPTION

Throughout this description and the claims, the indefinite article "a" or "an" means "one or more". Reference to "a first element" does not mandate presence of "a second element". Further, the expressions "first" and "second" are only used to distinguish one element from another element and not to indicate any order of the elements.

In the context of the present disclosure, a connection which allows for a relative movement within limits between the connected elements with at least one degree of freedom is referred to as floating connection. To allow a horizontal movement between the transport module units and the infrastructure system, a floating connection with two degrees of freedom is provided. A floating connection in one embodiment is achieved by providing a defined play between interacting connection elements. In other embodiments, the floating connection is achieved by a connection having elastically deformable properties.

In use of a modular transport plane, a thermal expansion or contraction of a floor on which the modular transport plane is built up, of the infrastructure system, of back irons of the transport module units and/or of other elements, may result in horizontal forces moving transport module units apart or towards each other. By connecting neighboring transport module units via the back irons for a horizontal force transmission between neighboring transport module units, the transport module units act as a chain pulling each other (within limits) to compensate relative movements.

An actuator assembly of a transport module unit for example further comprises a plurality of coils mounted to the back iron and controller circuit board. The transport module unit may further comprise a driving surface assembly for example comprising a driving surface, a driving surface support and a sensor board. The sensor board at least forms part of a device for sensing a presence or position of a carrier moved across the upper side of the driving surface. In one embodiment, the driving surface is transparent to IR light, wherein the sensor board can be equipped with multiple IR based reflection light barriers arranged in a grid, and the sample container carriers can be adapted to reflect IR radiation emitted by the light barriers. In other embodiments, the sensor board is equipped with inductive sensors adapted for detecting a position of a carrier moved across the upper side of the driving surface. The transport module units in embodiments are mounted above a base plate assembly with cabling for a power supply, cabling for a communication, and a cooling infrastructure.

In one embodiment, the back irons of two neighboring transport module units are arranged with a gap and are configured to contact each other for a horizontal force transmission between said two neighboring transport module units in response to a relative horizontal movement between said two neighboring transport module units towards each other in a first direction. By arranging the back irons of neighboring transport module units with a gap under standard conditions, stresses can be avoided, which could otherwise be caused by forces exerted when pushing the back irons against each other due to a smaller thermal expansion of the infrastructure system. However, the gap is chosen small enough so that the gap does not impact a movement of carriers from one transport module unit to the next. In embodiments, the gap ranges from zero to no more than a few millimeters, more particular from 0.5 mm to 2 mm. In case the thermal expansion or misalignment exceeds a threshold value, the back irons can push against each other for a force transmission. The two neighboring transport module units in one embodiment are arranged side-to-side, wherein the first direction is perpendicular to sides of the two neighboring transport module units facing each other.

In one embodiment, the infrastructure system comprises a plurality of support elements. The support elements are configured to support at least in part the transport module units. In one embodiment the transport module units each comprise a driving surface assembly, which driving surface assembly is supported by the support elements. In one embodiment, the support elements each have a back iron interface configured to interlock with the back irons of the actuator assemblies of two neighboring transport module units, such that a relative horizontal movement of said two neighboring transport module units away from each other is restrained and, in response to a restrained relative horizontal movement, forces are transmitted between said two neighboring transport module units via the back irons and the back iron interface. Providing support elements having back iron interfaces allows using the support elements and the back irons for a transmission of horizontal forces resulting from thermal contraction or thermal expansion.

The back iron interface in one embodiment comprises two parallel vertical force application surfaces facing each other, wherein each force application surface is configured to interlock with the back iron of one of said two neighboring transport module units. The two vertical force application surfaces in embodiments of the support element are arranged perpendicular to the first direction in which said two neighboring transport module units are moved towards each other or away from each other.

In addition, in embodiments of the support element the back iron interface comprises a support surface configured to support the back irons of said two transport module units from below, wherein in particular the support surface is arranged off-set from the vertical force application surfaces in a direction away from a center of the support element.

In embodiments of the actuator assemblies, the back irons each have a grid structure with intersecting straight elements, wherein a first straight element is provided at one or both of its ends with a pawl extending perpendicular to its longitudinal direction, which pawl is configured to interlock with one of the force application surfaces of an associated one of the plurality of support elements, which force application surface is arranged perpendicular to the longitudinal direction of the first straight element, wherein in particular the pawls of the back irons of two neighboring transport module units are arranged between the two force application surfaces of one back iron interface of an associated one of the support elements. In one embodiment, the pawls only contact the force application surface and do not contact the support surface of the support element.

In one embodiment, the back irons each have a rectangular basic shape, wherein straight elements arranged at sidelines of the grid structure are provided at both ends with a pawl extending perpendicular to their longitudinal direction, wherein in particular the pawls point towards virtual tips of corner regions of the grid structure.

In one embodiment, the support element is a corner support element having four back iron interfaces and configured to be arranged at a corner junction of up to four transport module units having a rectangular basic shape, in particular a square basic shape.

In embodiments of the infrastructure system, the infrastructure system comprises a plurality of base plate assemblies arranged below the transport module units. In embodiments, the base plate assemblies are provided on a one-by-one with the transport module units, wherein one base plate assembly is arranged below every transport module unit. The base plate assemblies in embodiments comprise a cabling, a power supply, a communication system and/or a cooling infrastructure for the associated transport module units. The infrastructure system may further comprise base frame elements, such as struts, legs and/or feet, for supporting the base plate assemblies on a floor.

In one embodiment, the base plate assemblies are arranged with gaps and connected to each other. In one embodiment, additional elements are provided for connecting the base plate assemblies to each other. In other embodiments, the base plate assemblies are connected via the support elements.

In one embodiment, in order to allow a relative horizontal movement between the support elements and the base plate assemblies, the support elements and the base plate assemblies are connected with play, for example via a sliding connection, and/or at least one of the plurality of support elements and the plurality of base plate assemblies is at least partly elastically deformable.

The support element in embodiments is a one-piece element mounted, in particular floatingly mounted, to base plate assemblies or to other elements of the infrastructure system. In other embodiments, the support element comprises a lower part having a mounting structure and an upper part having the back iron interface, wherein the upper part is connected lengthwise to the lower part via a connection structure, and wherein the connection structure is configured to restrain a relative movement between the lower part and the upper part in the longitudinal direction of the support element, i.e., the vertical direction, and to allow a limited relative movement between the lower part and the upper part in a plane perpendicular to the longitudinal direction of the support element, i.e., in a horizontal plane. In other words, the upper part is connected in a floating manner to the lower part. In one embodiment, the mounting structure of the lower part is configured to mount the lower part to a support frame of the infrastructure system. In other embodiments, base plate assemblies are provided, and the mounting structure of the lower part is configured to mount the lower part to the base plate assemblies. In either case, a relative movement between the infrastructure system and the transport module units is possible.

As mentioned above, in embodiments, the transport module units comprise driving surface assemblies. In embodiments, the support element has an upper support surface with up to four driving surface assembly interfaces configured to engage with complementary interfaces at corner regions of driving surface assemblies having a square basic shape. In other embodiments, the support element has an upper support surface with up to six or up to three driving surface assembly interfaces configured to engage with complementary interfaces at corner regions of driving surface assemblies having a triangular or a hexagonal basic shape, respectively. To allow for a thermal expansion or contraction, the driving surface assemblies in one embodiment are floatingly connected to the support element and/or arranged with small gaps therebetween.

In one embodiment, the actuator assemblies each comprise a handle protection arranged below the back iron and the base plate assemblies each comprise a base plate and an air guide protruding upwards from the base plate and configured for connection with the handle protection, wherein in order to allow a relative horizontal movement between the base plate assembly and the actuator assembly, the air guide and the handle protection are connected with play and/or via an elastically deformable sealing strip. In one embodiment, the play between the handle protection and the air guide is dimensioned larger than a play of the floating connection for example via the support elements, so that the connection between the handle protection and the air guide does not limit a relative movement in a horizontal plane.

In one embodiment, the infrastructure system comprises a plurality of struts, wherein to each strut a number of the plurality of base plate assemblies is mounted, and wherein the struts are arranged with gaps to allow for a relative horizontal movement between the struts. Due to the floating connection between the transport module units and the infrastructure system, a limited movement of the struts due to thermal expansion or contraction is possible, while minimizing a movement of the transport module units.

In particular, in one embodiment, at least one of the plurality of transport module units located at a border of the modular transport plane is configured as a transport system interface unit and is rigidly connected to a connected device arranged adjacent to the modular transport plane. In the context of the application, loading or unloading devices as well as pre-analytic, analytic, and post analytic instruments or devices to which, or starting from which carriers are transported across the transport plane are referred to as "connected devices". The connected devices include tube sorters, centrifuges, de-capper, re-capper, storage refrigerators, transfer devices, blood analyzers, urine analyzers or other analyzers to analyze a body fluid or tissue. However, other connected devices are conceivable. Due to the rigid connection, a handover position between the connected device and the modular transport plane is maintained within tolerances, wherein high forces resulting from a relative movement due to a thermal expansion or contraction are avoided by distributing the forces across the modular transport plane via the back irons.

According to another embodiment, a laboratory distribution system with a modular transport plane and a plurality of carriers is provided, wherein the carriers each comprise at least one magnetically active device, typically at least one permanent magnet, and are configured to carry a specimen container.

According to yet another embodiment, a laboratory automation system with a plurality of pre-analytical, analytical and/or post-analytical stations, and with a laboratory distribution system is provided.

In order that the embodiments of the present disclosure may be more readily understood, reference is made to the following examples, which are intended to illustrate the disclosure, but not limit the scope thereof.

FIG. 1 schematically shows a top view of an embodiment of a modular transport plane 10 built from several, in the embodiment shown twenty transport module units 1. The transport module units 1 are connected to an infrastructure system 2 comprising support struts 21 Each of the transport module units 1 shown has a square basic shape allowing building of transport planes 10 of various designs by adding additional transport module units 1 at either side of already existing units 1 and/or removing transport module units 1 from the transport plane 10 shown in FIG. 1. In other embodiments, the transport module units have a different basic shape, for example a triangular basic shape or a hexagonal basic shape. Typically, all transport module units 1 have the same basic shape, wherein the shape is a tessellating shape. However, in specific embodiments, a transport device is composed of transport module units 1 having different basic shapes.

Figure 2:
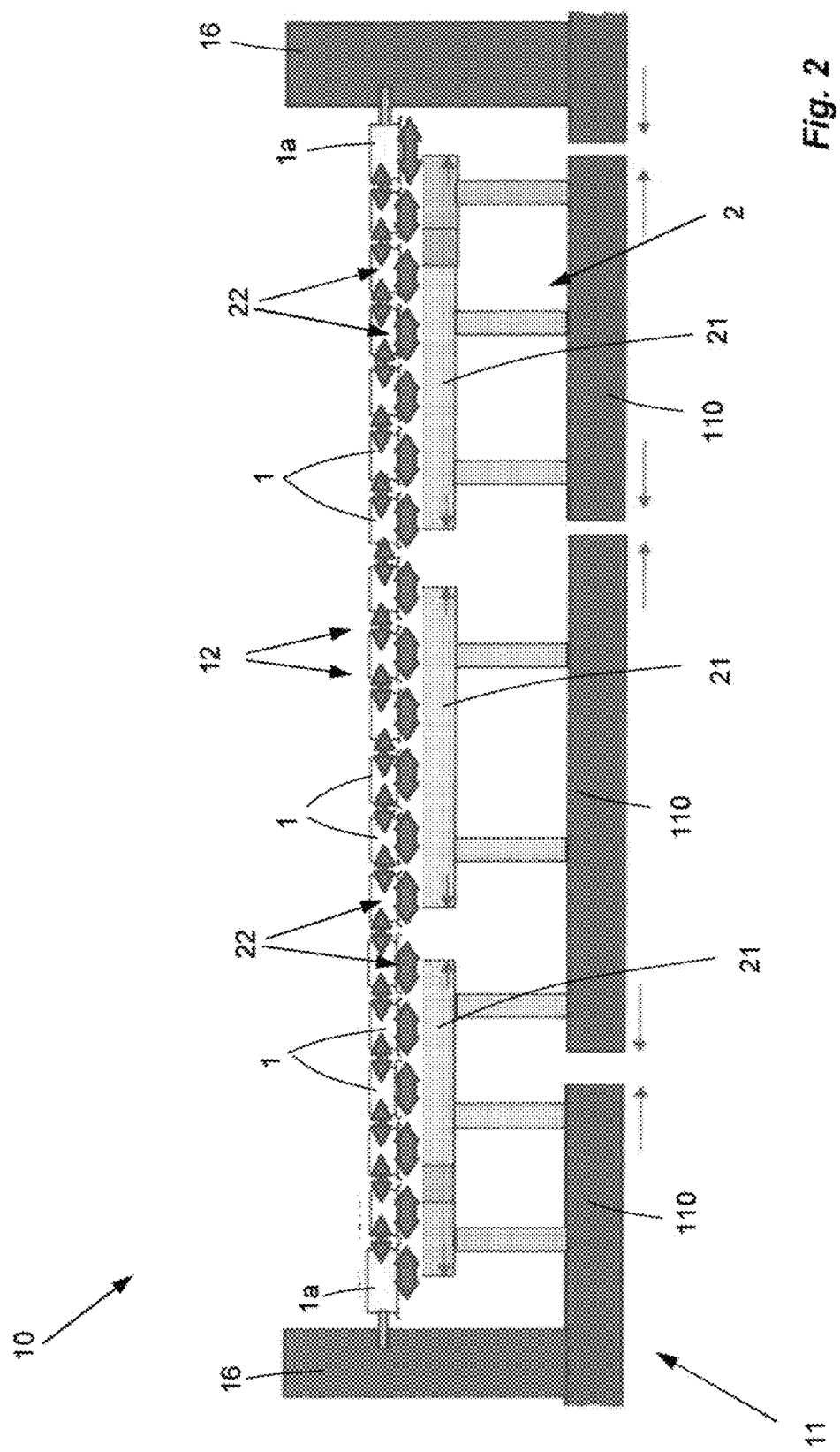
FIG. 2 is a side view of a modular transport plane for a laboratory distribution system built from several transport module units in accordance with an embodiment of the present disclosure.

FIG. 2 schematically shows a side view of an embodiment of a modular transport plane 10 with several transport module units 1 and the infrastructure system 2 arranged below the transport module units 1 and supporting the transport module units 1 on a floor 11, which in the embodiment shown comprises several floor panels 110. The infrastructure system 11 comprises several struts 21 arranged with gaps therebetween.

As schematically indicated by arrows 22, the transport module units 1 are floatingly connected to the infrastructure system 2 to allow a relative horizontal movement between the transport module units 1 and the infrastructure system 2. In addition, neighboring transport module units 1 are connected as indicated with arrows 12 for a horizontal force transmission between neighboring transport module units 1 in response to a relative horizontal movement between neighboring transport module units 1.

On the left side and the right side of the modular transport plane 10 connected devices 16 are arranged, for example tube sorters, centrifuges, de-cappers, re-cappers, storage refrigerators and/or analyzers to analyze a body fluid or tissue. Each connected device 16 is rigidly connected to the transport module unit 1a adjacent to the connected device 16 for a handover accuracy between the modular transport plane 10 and the connected devices 16. The transport module unit 1a arranged adjacent to the connected device 16 is also referred to as interface unit and may differ in design from other transport module units 1. The connected device 16 and the interface unit may be arranged on a common floor panel 110 as shown on the left in FIG. 2 or on different floor panels 110 as shown on the right in FIG. 2.

Generally, all components of the modular transport plane 10 may expand during ambient temperature rise and shrink during temperature decrease. In the embodiment shown, the struts 21 and the floor panels 110 are arranged with gaps. Therefore, in case of a thermal expansion, the struts 21 and/or the floor panels 110 expand into the gaps.

In order to decouple within limits a movement of the transport module units 1 from the movement of the infrastructure system 2 and to prevent high force from building up during the thermal expansion, the transport module units 1 are floatingly connected to the infrastructure system 2.

Neighboring transport module units 1 are connected as indicated by arrows 12 and act as a chain pulling each other (up to their limit stops) to compensate relative movements of the floor 11 and the infrastructure system 2. The chain is confined by the rigid connection of the connected devices 16 and the adjacent transport module units 1a.

As will be explained in more detail below, a path for a horizontal force transmission between transport module units 1 during system expansion or contraction is provided via back irons (not shown in FIG. 2) of the transport module units 1.

Figure 3:
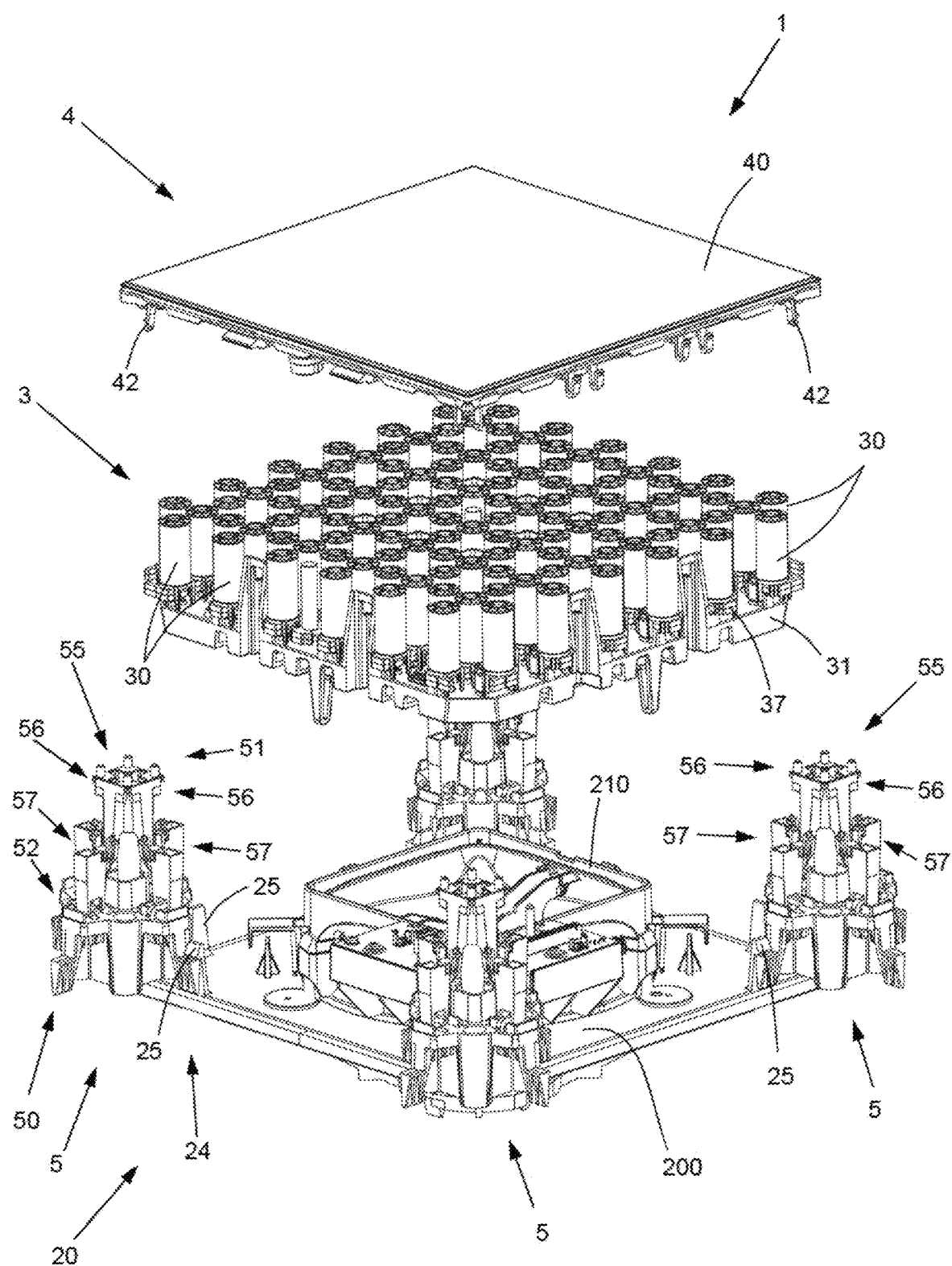
FIG. 3 is an exploded view of a transport module unit in accordance with an embodiment of the present disclosure.

FIG. 3 shows an embodiment of a transport module unit 1 together with a base plate assembly 20 and support elements for building a transport plane 10 of FIG. 1 or FIG. 2 in an exploded view. The transport module unit 1 shown in FIG. 3 comprises two assemblies, namely an actuator assembly 3 and a driving surface assembly 4. The actuator assembly 3 comprises a plurality of electro-magnetic actuators 30 mounted to a back iron 37, wherein the back iron 37 is supported by a handle protection 31. The driving surface assembly 4 comprises a driving surface 40, a driving surface support with an interface 42 and a sensor board (not visible). In the embodiment shown, the transport module units 1 are provided on a one-by-one with base plate assemblies 20, which are located underneath the transport module units 1 and configured for connecting the transport module unit 1 to the support struts 21 (see FIGS. 1 and 2).

In the embodiment shown, support elements are provided, which are mounted to the base plate assembly 20, wherein adjacent transport module units 1 are connected by means of the support elements. In the embodiment shown, the support elements are in the form of corner support elements 5 connecting corner regions of up to four neighboring transport module units 1. In an alternative embodiment, in which the transport module units have a triangular basic shape or a hexagonal basic shape, the corner support elements are designed to support the corner regions of up to six or up to three neighboring transport module units, respectively. Alternatively or in addition, in still another embodiment, support elements connecting neighboring transport module units 1 at the side surfaces are provided.

The base plate assembly 20 shown comprises a base plate 200 having an essentially square basic shape with four sides and four corners and an air guide 210 protruding upwards from the base plate 200.

The base plate 200 is provided with snap-on elements 25 arranged at the corners. The corner support elements 5 are provided with a mounting structure for mounting the corner support elements 5 to the corners of the base plates 20 of neighboring base plate assemblies 20, wherein the base plates 200 are aligned by means of the corner support elements 5. The corner support elements 5 are further provided with an upper support surface 55 having a driving surface assembly interface 56 configured to engage with complementary interfaces 42 of the supported driving surface assemblies 4. In other words, in the embodiment shown the corner support element 5 functions as a connection node for up to four base plate assemblies 20 and for up to four driving surface assemblies 4. Further, the corner supports 5 are provided with back iron interfaces 57.

Figure 5:
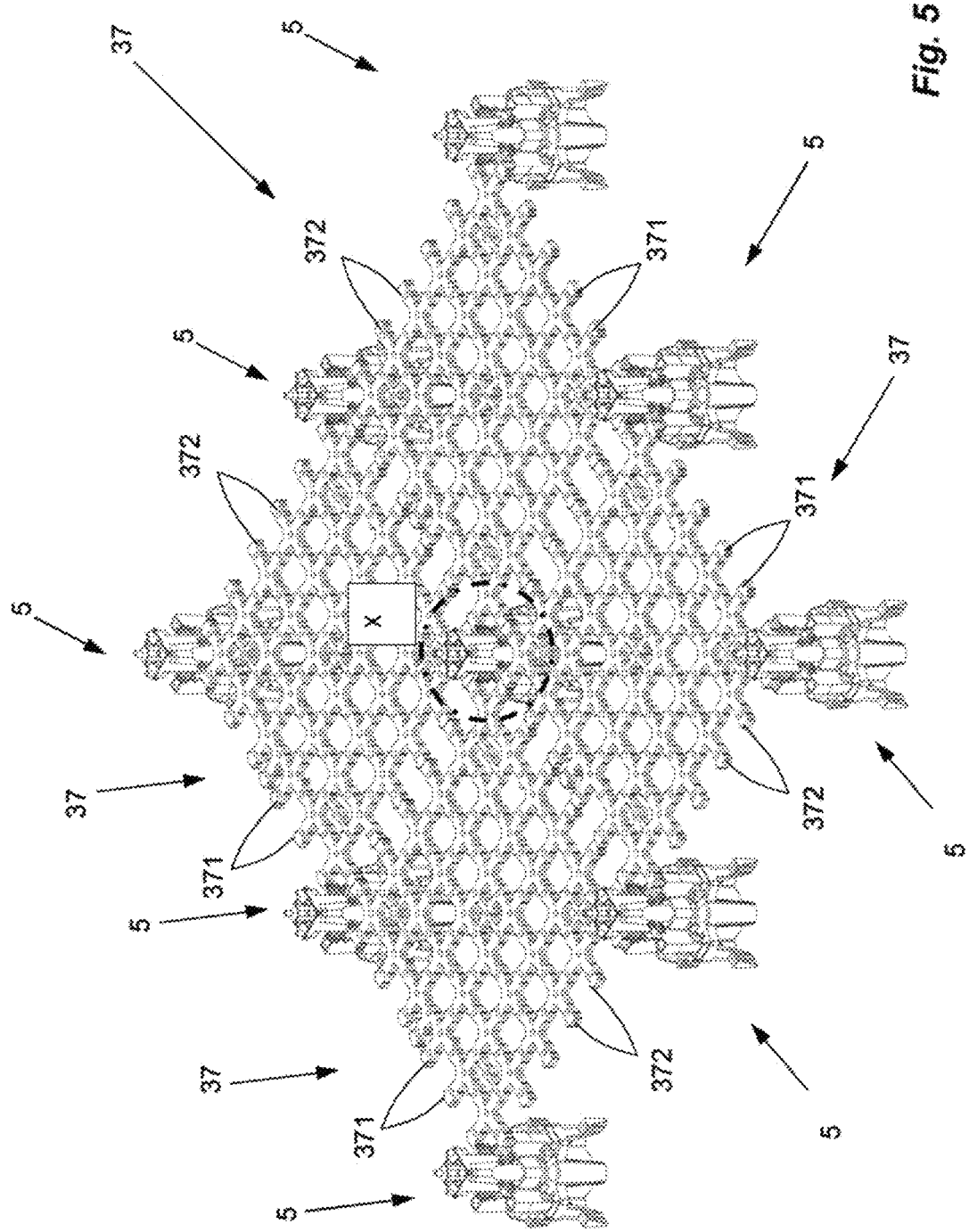
FIG. 5 is a perspective view of four base plate assemblies interconnected by corner support elements and back irons of associated actuator assemblies in accordance with an embodiment of the present disclosure.

For a floating connection between the transport module units 1 and the base plate assembly 20, the corner support element 5 shown in FIG. 5 is a two-part element and comprises a lower part 50 and an upper part 51, which upper part 51 is connected lengthwise to the lower part 50 via a connection structure 52. The connection structure 52 is such that the upper part 51 is connected in a floating manner to the lower part 50. This allows a relative movement between base plate assemblies 20 and driving surface assemblies 4 connected to the corner support element 5 in a horizontal plane. Alternatively or in addition, the corner support elements 5 are mounted with play and/or via elastically deformable elements to the base plate assemblies 20 or to a strut 21 of the infrastructure system 2.

Figure 4:
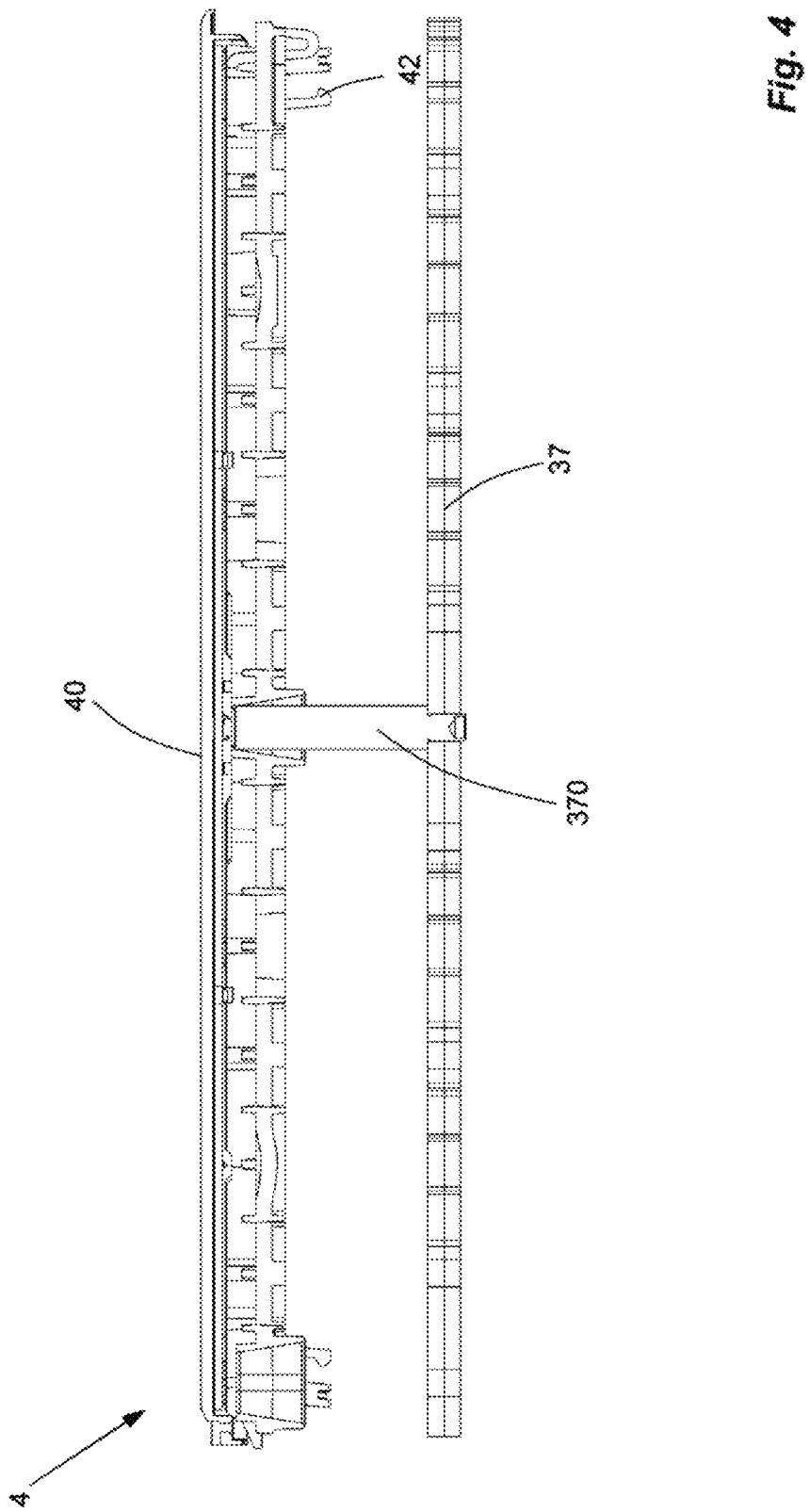
FIG. 4 is a sectional side view showing a back iron and a driving surface assembly of a transport module unit in accordance with an embodiment of the present disclosure.

FIG. 4 is a sectional side view showing a back iron 37 and a driving surface assembly 4 of a transport module unit 1. As shown in FIG. 4, a central pin 370 is provided on the back iron 37, which interfaces with the driving surface assembly 4 in order to make sure that the driving surface assembly 37 remains centered to the back iron 37 as it moves.

To compensate relative movements of the floor panels 110 (see FIG. 2) and/or the infrastructure system 2 due to thermal expansion or contraction, a path is provided for a horizontal force transmission using the back irons 37.

Figure 6:
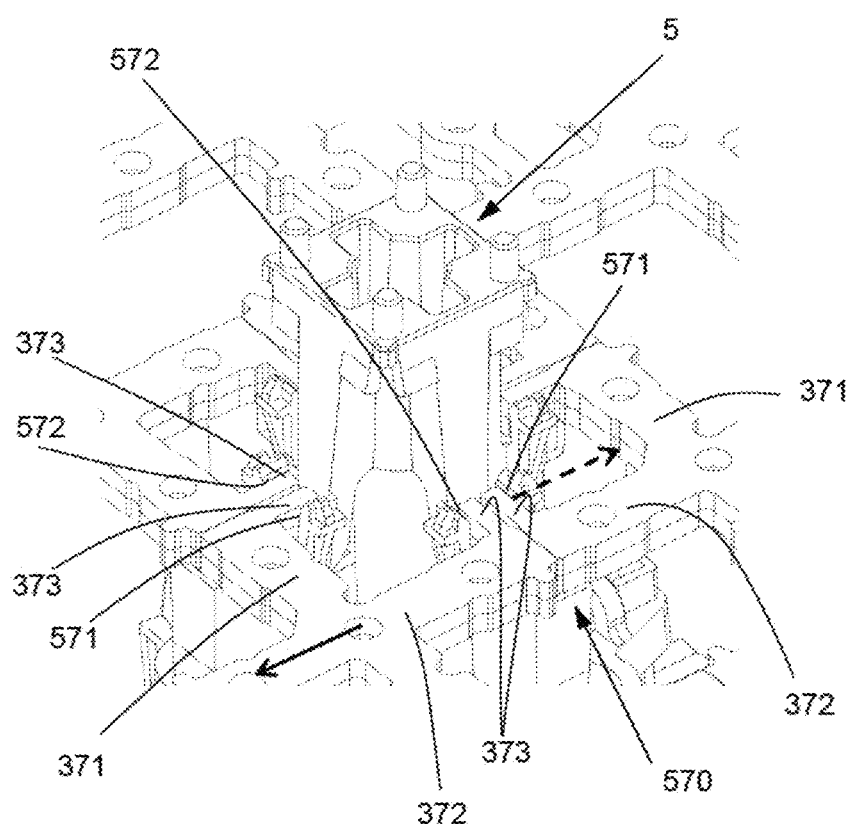
FIG. 6 is a detail X of FIG. 5 showing a force transmission via back irons when moving the transport module units apart from each other in accordance with an embodiment of the present disclosure.
Figure 7:
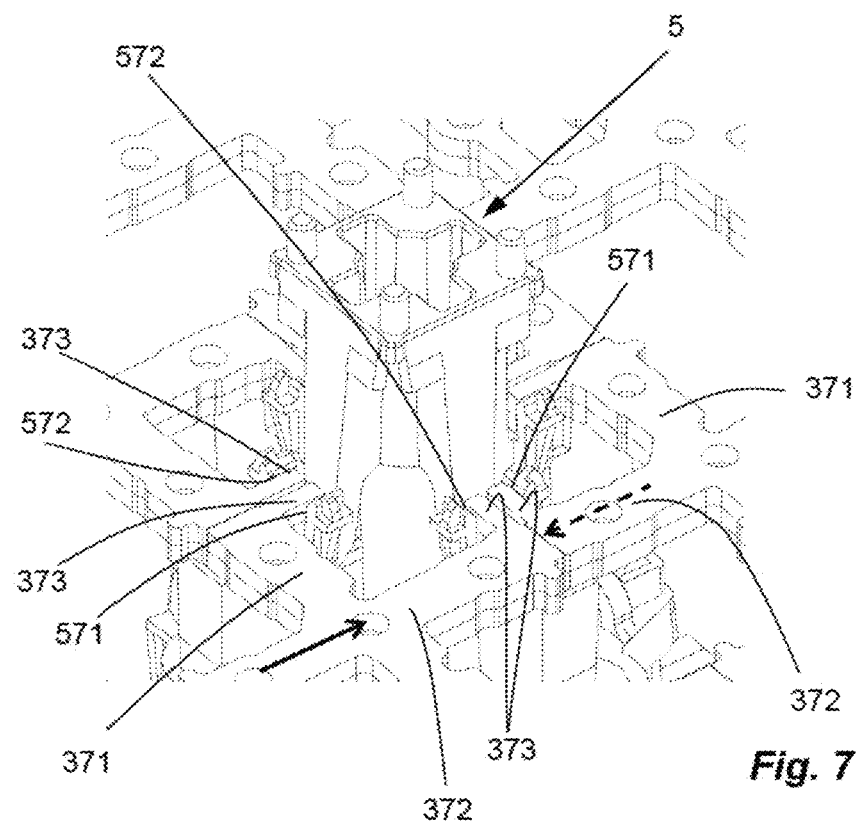
FIG. 7 is a detail X of FIG. 5 showing a force transmission via back irons when moving the transport module units towards each other in accordance with an embodiment of the present disclosure.

FIG. 5 is a perspective view of four back irons 37 of associated actuator assemblies 3 (see FIG. 3 or FIG. 4), which are supported by corner support elements 5 and interconnected by the corner support elements 5 for a force transmission. FIGS. 6 and 7 are a detail X of FIG. 5.

As shown in FIG. 5, the back irons 37 each have a grid structure with intersecting straight elements 371, 372. The straight elements 371, 372 of the back irons 37 of neighboring actuator assemblies 3 are aligned.

As best seen in FIGS. 6 and 7, the corner support element 5 has four back iron interfaces 57 arranged at the four sides of the corner support element 5 (only two visible in FIGS. 6 and 7). Each back iron interface 57 comprises two parallel vertical force application surfaces 571, 572, wherein the vertical force application surfaces 571, 572 extend perpendicular to the respective side of the corner support element 5. Free ends of straight elements 371, 372 arranged at sidelines of the grid structure are provided with pawls 373, extending perpendicular to the longitudinal direction of the respective straight element 371, 372. The pawls 373 are configured to interlock with the force application surfaces 571, 572, wherein two pawls 373 of neighboring back irons 37 are received between two opposing force application surfaces 571, 572 of one back iron interface 57. The pawls 373 are arranged between the force application surfaces 571, 572 leaving a small gap between the two pawls 373 under standard conditions.

When forces are acting on transport module units 1, which cause one transport module unit 1 to move apart from a neighboring transport module unit 1 as shown by an arrow in FIG. 6, for example due to thermal contraction or thermal expansion within the modular transport plane 10, the interlocking connection between force application surfaces 571, 572 and the pawls 373 received between the force application surfaces 571, 572 causes a force transmission to the back iron 37 of the neighboring transport module unit 1 as schematically shown by a dotted arrow in FIG. 6. The force transmission causes a chain effect in the modular transport plane 10, wherein by pulling on the back iron 37 of the neighboring transport module unit 1, a relative movement is distributed in the transport plane 10.

When forces are acting on transport module units 1, which cause one transport module unit 1 to move closer towards a neighboring transport module unit 1 as shown by an arrow in FIG. 7, for example due to thermal contraction or thermal expansion within the modular transport plane 10, the back irons 37 will contact each other, thereby causing a force transmission to the back iron 37 of the neighboring transport module unit 1 as schematically shown by a dotted arrow in FIG. 7. The force transmission causes a chain effect in the modular transport plane 10, wherein by pushing on the back iron 37 of the neighboring transport module unit 1, a relative movement is distributed in the transport plane 10.

In embodiments of the present disclosure, all straight elements 371, 372 of neighboring back irons 37 are arranged with a gap there between, wherein the gaps are identical in size across the whole length and/or width of the back iron 37, such that upon a relative movement of the back irons 37 towards one another all straight elements 371, 372 of neighboring back irons 37 at least essentially simultaneously come into contact.

The back iron interface 57 further comprises a support surface 570 configured to support the back irons 37 from below. In the embodiment shown, the support surface 570 is arranged off-set from the vertical force application surfaces 571, 572 in a direction away from a center of the corner support element 5 such that the support surfaces 570 contacts the back irons 37 in a position, which is distinct from the pawls 373.

In order to avoid that the forces are transmitted via the driving surface assemblies 4 instead of via the back irons 37, in one embodiment, the driving surface assemblies 4 are arranged with small gaps and connected to the support elements with play.

The embodiments shown are only exemplary and various modifications can be made in construction and arrangement within the scope of the present disclosure as defined in the appended claims.

What is claimed is:

1. A modular transport plane with a plurality of transport module units, each transport module unit comprising an actuator assembly with a back iron, and with an infrastructure system arranged below the transport module units and supporting the transport module units on a floor, characterized in that the transport module units are floatingly connected to the infrastructure system to allow a relative horizontal movement between the transport module units and the infrastructure system, wherein neighboring transport module units are connected via the back irons for a horizontal force transmission between neighboring transport module units in response to a relative horizontal movement between neighboring transport module units.

2. The modular transport plane according to claim 1, characterized in that the back irons of two neighboring transport module units are arranged with a gap and are configured to contact each other for a horizontal force transmission between said two neighboring transport module units in response to a relative horizontal movement between said two neighboring transport module units towards each other in a first direction.

3. The modular transport plane according to claim 1, characterized in that the modular transport plane further comprises a plurality of support elements, wherein the support elements each have a back iron interface configured to interlock with the back irons of the actuator assemblies of two neighboring transport module units, such that a relative horizontal movement of said two neighboring transport module units away from each other is restrained and in response to a restrained relative horizontal movement forces are transmitted between said two neighboring transport module units via the back irons and the back iron interface.

4. The modular transport plane according to claim 3, characterized in that the back iron interface comprises two parallel vertical force application surfaces facing each other, wherein each force application surface is configured to interlock with the back iron of one of said two neighboring transport module units.

5. The modular transport plane according to claim 4, characterized in that the back iron interface comprises a support surface configured to support the back irons of said two transport module units from below, wherein in particular the support surface is arranged off-set from the vertical force application surfaces in a direction away from a center of the support element.

6. The modular transport plane according to claim 4, characterized in that the back irons each have a grid structure with intersecting straight elements, wherein a first straight element is provided at one or both of its ends with a pawl extending perpendicular to its longitudinal direction, which pawl is configured to interlock with one of the force application surfaces of an associated one of the plurality of support elements, which force application surface is arranged perpendicular to the longitudinal direction of the first straight element, wherein in particular the pawls of the back irons of two neighboring transport module units are arranged between the two force application surfaces of one back iron interface of an associated one of the support elements.

7. The modular transport plane according to claim 6, characterized in that the back irons each have a rectangular basic shape, wherein straight elements arranged at sidelines of the grid structure are provided at both ends with a pawl extending perpendicular to their longitudinal direction, wherein in particular the pawls point towards virtual tips of corner regions of the grid structure.

8. The modular transport plane according to claim 3, characterized in that the support element is a corner support element having four back iron interfaces and configured to be arranged at a corner junction of up to four transport module units having a rectangular basic shape.

9. The modular transport plane according to claim 3, characterized in that the infrastructure system comprises a plurality of base plate assemblies arranged below the transport module units, wherein the base plate assemblies are arranged with gaps and connected to each other.

10. The modular transport plane according to claim 9, wherein the base plate assemblies are connected to each other via the support elements.

11. The modular transport plane according to claim 9, characterized in that in order to allow a relative horizontal movement between the support elements and the base plate assemblies the support elements and the base plate assemblies are connected with play and/or at least one of the plurality of support elements and the plurality of base plate assemblies is at least partly elastically deformable.

12. The modular transport plane according to claim 9, characterized in that the actuator assemblies each comprise a handle protection arranged below the back iron and the base plate assemblies each comprise a base plate and an air guide protruding upwards from the base plate and configured for connection with the handle protection, wherein in order to allow a relative horizontal movement between the base plate assembly and the actuator assembly, the air guide and the handle protection are connected with play and/or via an elastically deformable sealing strip.

13. The modular transport plane according to claim 9, characterized in that the infrastructure system comprises a plurality of struts, wherein to each strut a number of the plurality of base plate assemblies is mounted, and wherein the struts are arranged with gaps to allow for a relative horizontal movement between the struts.

14. The modular transport plane according to claim 1, characterized in that at least one of the plurality of transport module units located at a border of the modular transport plane is configured as a transport system interface unit and is rigidly connected to a connected device arranged adjacent to the modular transport plane.

15. A laboratory distribution system with a modular transport plane according to claim 1 and a plurality of carriers, the carriers each comprising at least one magnetically active device.

16. The laboratory distribution system with a modular transport plane according to claim 15, wherein the at least one magnetically active device is at least one permanent magnet that is configured to carry a specimen container.

17. A laboratory automation system with a plurality of pre-analytical, analytical and/or post-analytical stations, and with a laboratory distribution system according to claim 15.

* * * * *